July 20, 1926.

M. C. OVERMAN

TIRE

Filed June 19, 1922

1,592,959

Inventor
Max Cyrus Overman
By his Attorney
E. W. Scherr Jr.

Patented July 20, 1926.

1,592,959

UNITED STATES PATENT OFFICE.

MAX CYRUS OVERMAN, OF NEW YORK, N. Y.

TIRE.

Application filed June 19, 1922. Serial No. 569,198.

My present invention relates to improvements in tires including the tires of the general type illustrated in the accompanying drawings, whereby I provide an improvement for counteracting the tendency to attrition and wear due to the working of the basal portions of the tire on one another when the tire is in action; improvements which hold the inner members to the rim against the action of centrifugal force; an improvement which increases the lateral stabilizing value of the elbow-shaped outer members relatively to the inner members; and an improvement which causes the outer members to assume more of the circumferential driving strain than they heretofore have done.

Other features and advantages of my invention will appear from an understanding of the following description read in connection with the drawings which purport to show only the preferred embodiment of my improvements although other embodiments are possible within the scope of my invention.

Figure 1:
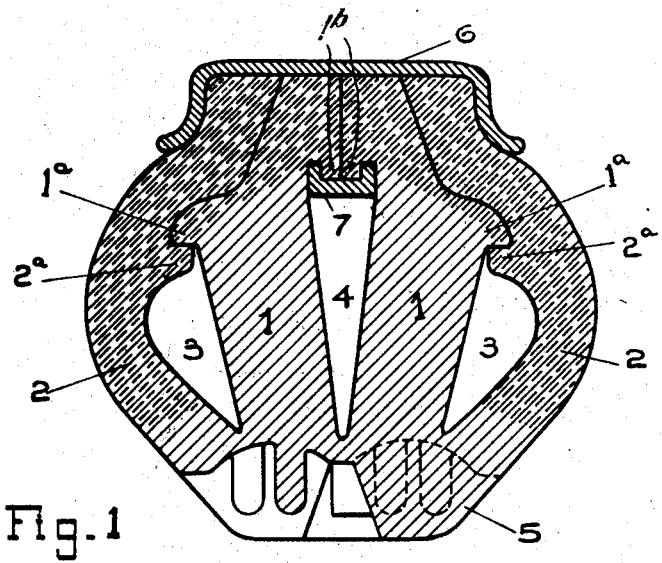
Figure 2:
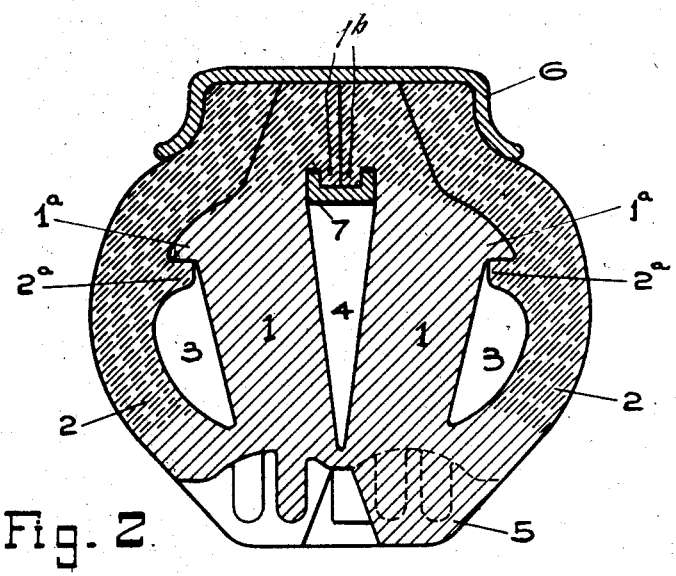

In the drawings, Fig. 1 is a cross sectional view through my improved tire on a tire rim, which latter may be of any well known form, preferably of the demountable type; and Fig. 2 is a similar view of a modification of the tire of my present invention.

The expressions of direction such as "upper" and "lower" in the description and claims refer to a section of the tire in ground contact as shown in the drawings. The expressions "upright" in the description and claims definitive of the inner members; and "elbow-shaped" definitive of the outer members; and "ends" definitive of the upper and lower portions of said members; and similar expressions, of course refer to said members when looked at or considered in transverse section as in Figs. 1 or 2.

In the illustrated tires within my invention, 1—1 are upright load-supporting and shock-absorbing inner members and 2—2 are outer members serving to laterally stabilize or brace the inner members but having other functions as will hereinafter be pointed out. These members 1 and 2 are relatively closely adjacent, separated by proper spaces, two of which 3—3 are similar in cross-section and the third space being designated 4.

The lower ends of all these members are integrally united by a tread or nose portion 5. The outer laterally stabilizing members 2—2 are elbow-shaped in cross-section, their lower limbs converging toward the tread and their upper limbs toward the rim.

The respective members 1—1 and 2—2 and spaces 3—3 and 4 may be circumferentially continuous around the tire. Also the whole tire is preferably molded as an entirety. The material is, of course, rubber or rubber compound or other suitable rubber-like material, with or without fabric reinforcing, and the like.

The upper portions of said inner and outer members when on the rim 6 are adapted to be in side by side contact with their free ends contained within the flange space of the rim, as shown in the drawings.

The clamping ring 7 as usual clamps the portions 1$^b$ of the inner members to the rim; and the upper portions of said inner members are adapted in turn to clamp the corresponding portions of the outer members against the rim and flanges.

The inner side of each outer member has a lateral projection 2$^a$ adapted to hook under a corresponding lateral projection 1$^a$ from the adjacent inner member, said projections 2$^a$ serving to hold the inner members 1 from pulling away from the rim which is their tendency due to centrifugal action when the wheel is in motion.

The said projections 1$^a$ fit into recesses formed to receive them in the adjacent portions of the outer members 2 (Figs. 1 and 2).

The tires of Figs. 1 and 2 differ in the shape of these projections 1$^a$,—those in Fig. 1 having their upper sides more convexly rounded than in Fig. 2, the latter being preferable, at least from the point of view of not weakening so much the cross-section of the outer members 2.

However, the particular shapes of the projections 1$^a$ and 2$^a$ are not essential provided they are not changed to the extent of preventing them from fulfilling their functions.

The projections 1$^a$ by being stepped into the adjoining recesses in the members 2 and by being engaged by the projections 2$^a$ effectually lock together the upper portions of the members 1 and 2 and thereby tend to reduce attrition and wear of said upper portions by preventing them from working on one another when the tire is in action. The said projections 1$^a$ accomplish this result all the more effectually because they themselves are located out of the line of flow of the compression forces in the members 1.

The more solidly cross-hatched portions of the inner and outer members in the drawings are intended to indicate that the rubber or rubber compound of said portions is relatively harder than the rest of the tire. Thus, it will be seen that the outer members are formed of this relatively harder material down substantially to where they join the tread or nose portion 5. The said outer members 2 are thereby so stiffened that their lateral bracing and stabilizing action on the inner members 1 is increased to a maximum. Furthermore, the same fact makes them take to themselves more of the circumferential driving strain, thereby correspondingly relieving the inner members 1 and saving them from being overworked.

The upper portions of both the inner and outer members being made of the harder material where they contact with one another, of course reduces the attrition and wear between said portions because the harder or firmer and therefore less yielding and compressible material has less tendency to work compressively and expansively when the tire is in action.

The hooks 2$^a$ in both the Figs. 1 and 2 are formed of the harder material for the increased resistance thereby offered to the centrifugal pulling away of the inner members 1 from the rim. For the same reason the co-acting projections 1$^a$ in Fig. 1 are likewise formed of harder material.

What I claim is:—

1. In a tire, the combination of spaced inner and outer members, a tread portion uniting the lower ends of said members, their upper portions being adapted to be secured to a rim in side by side contact, the outer side of each inner member having a lateral projection out of the line of flow of the compression forces in said members, said projections being entered into corresponding recesses formed in the adjacent portions of the outer members.

2. In a tire, the combination of spaced inner and outer members, a tread portion uniting the lower ends of said members, their upper portions being adapted to be secured to a rim in side by side contact, the inner side of each outer member outside of the rim space having a lateral projection adapted to hook under a corresponding lateral projection from the adjacent inner member and to restrain said inner member against the action of centrifugal force when the tire is in action.

3. In a tire, the combination of spaced inner and outer members, a tread portion uniting the lower ends of said members, their upper portions being adapted to be secured to a rim in side by side contact, the inner side of each outer member outside of the rim space having a lateral projection adapted to hook under a corresponding lateral projection from the adjacent inner member and to restrain said inner member against the action of centrifugal force when the tire is in action, said projections from the inner members fitting into recesses formed in the adjacent portions of the outer members.

4. In a tire, the combination of spaced inner and outer members, a tread portion uniting the lower ends of said members, their upper portions being adapted to be secured in a flanged rim in side by side contact with the inner members clamped to the rim, and with these in turn clamping the outer members to the rim, each inner member having a lateral projection from its outer side, which projection is out of the line of flow of the compression forces in said members, said projections being entered into corresponding recesses formed in the adjacent portions of the outer members.

5. In a tire, the combination of spaced inner and outer members, a tread portion uniting the lower ends of said members, their upper portions being adapted to be secured in a flanged rim in side by side contact with the inner members clamped to the rim, and with these in turn clamping the outer members to the rim, each outer member having a hook-like lateral projection from its inner side outside of the rim space adapted to hook under a corresponding lateral projection from the adjacent inner member and to restrain said inner member against the action of centrifugal force when the tire is in action.

6. In a tire, the combination of spaced inner and outer members, a tread portion uniting the lower ends of said members, their upper portions being adapted to be secured in a flanged rim in side by side contact with the inner members clamped to the rim, and with these in turn clamping the outer members to the rim, each outer member having a hook-like lateral projection from its inner side outside of the rim space adapted to hook under a corresponding lateral projection from the adjacent inner member and to restrain said inner member against the action of centrifugal force when the tire is in action, said projections from the inner members fitting into recesses formed in the adjacent portions of the outer members.

7. The combination of claim 2, further characterized by the upper portions of the inner and outer members being formed of a relatively harder rubber compound wherever they are in contact down to and including the projections.

8. The combination of claim 2, further characterized by the upper portions of the inner and outer members being formed of a relatively harder rubber compound wherever they are in contact down to and including the projections; said harder compound being extended in the outer members down to substantially where they join the tread portion.

9. The combination of claim 2, further characterized by the outer members being formed of a relatively harder rubber compound down to substantially where they join the tread portion.

10. In a tire, the combination of spaced inner and outer members united by a tread portion, the upper portions of said members being adapted to be secured to a rim in side by side contact, the outer members being elbow-shaped in cross-section with the elbows directed outwardly from the sides of the tire and with their limbs converging toward the tread and the base of the tire respectively, said outer members consisting of a relatively harder rubber compound down to substantially where they join the tread portion.

11. In a tire, the combination of spaced inner and outer members united by a tread portion, the upper portions of said members being adapted to be secured to a rim in side by side contact, the outer members being elbow-shaped in cross-section with the elbows directed outwardly from the sides of the tire and with their limbs converging toward the tread and the base of the tire respectively, said outer members consisting of a relatively harder rubber compound down to substantially where they join the tread portion, and the upper portion of the inner members where they contact with the outer members also consisting of said relatively harder rubber compound.

Signed at New York, in the county of New York and State of New York this 16th day of June A. D. 1922.

MAX CYRUS OVERMAN.